June 18, 1929.　　　R. SPEIDEL　　　1,717,470
AIR FILTER
Filed Nov. 11, 1924
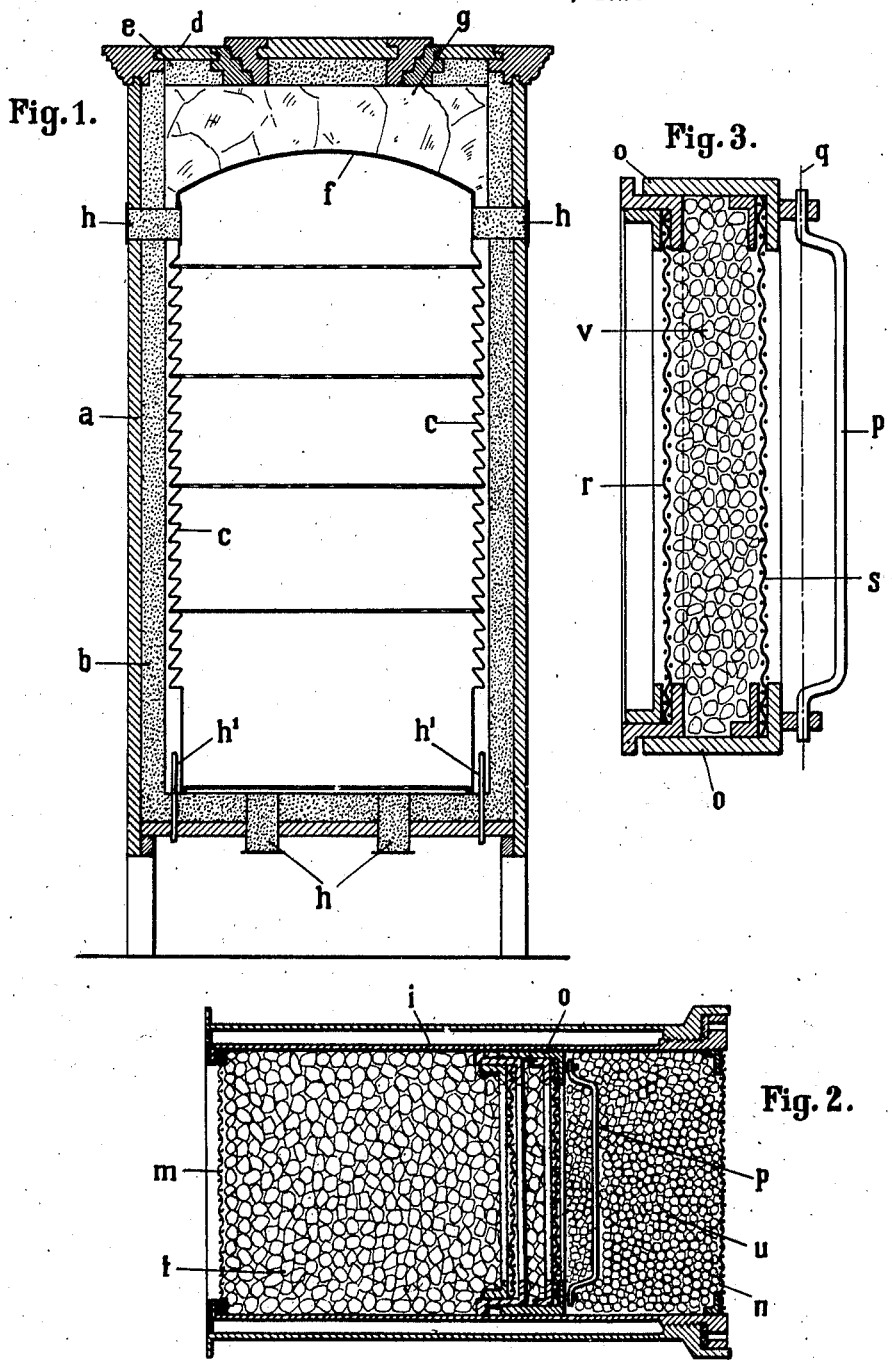
Inventor:
Robert Speidel
By Marks Clerk
Attys.

Patented June 18, 1929.

1,717,470

UNITED STATES PATENT OFFICE.

ROBERT SPEIDEL, OF CALMBACH, NEAR WILDBAD, GERMANY.

AIR FILTER.

Application filed November 11, 1924, Serial No. 749,307, and in Austria and Switzerland September 6, 1924.

This invention relates to air-filters for refrigerating chambers, ice safes and similar appliances. It is important that in the case of such appliances, to the inner chamber containing the provisions or the like fresh air be constantly led. This air however should not enter in a warm, unpurified condition.

The object of the present invention is to provide an air-filter which only permits the fresh outer air to enter in a pre-cooled, dust-free and sterilized condition.

The essence of the invention consists in the fact that an open-ended tubular member contains a displaceable disc shaped perforated container with sieve bottoms, between which a germicide is located, one compartment of the open-ended tubular member being filled with filtering material and the other compartment with heat insulating material.

The invention is illustrated by way of example in the accompanying drawing.

Figure 1 shows in sectional elevation an ice safe provided with filters according to the invention.

Figure 2 is a longitudinal section through the filter, on an enlarged scale; and Figure 3 shows, on a still larger scale, the disc shaped perforated container displaceable in the filter tube.

The ice safe has double outer walls $a$, $b$, made of wood and heat-insulating material, and inner walls $c$ of sheet zinc. There is also provided a double-walled cover $d$, $e$ of wood and heat-insulating material, and an inner cover $f$ of sheet zinc. Between the walls $b$ and $c$, and also between the outer cover $d$, $e$ and the inner cover $f$, there is a hollow space. On the cover $f$ there is the ice $g$ that serves for the cooling. The water from the melting ice flows down into the spaces between the walls $b$ and $c$, collects below, and is led away through the pipes $h'$. In the side walls and in the bottom of the ice safe are arranged the filters $h$. The construction of these filters is clearly shown in Figures 2 and 3.

Each filter consists of a metal tube $i$, which is screwed into a metal tube $k$, which is fixedly inserted in the ice safe. The filter tube is closed at both ends by wire sieves $m$ and $n$. In the tube $i$ is provided a displaceable disc shaped perforated container $o$ with a handle $p$. The handle $p$ is movable about the axis $q$. The disc shaped perforated container $o$ has two sieve bottoms $r$ and $s$. Between these two sieve bottoms is arranged germicide material $v$, consisting for example of potassium permanganate.

The sieve bottom $r$ is removably inserted in the disc shaped perforated container $o$, in order that the germicide material $v$ can be easily renewed at any time.

The inner space of the tube $i$ on the left-hand side of the disc shaped perforated container $o$ is filled with heat-insulating material $t$, while the space to the right of the disc shaped perforated container $o$ is filled with filtering material $u$. Both the heat-insulating material and the filtering material consist of pieces of cork (cork chips), impregnated with a water-repelling medium.

The impregnating of the cork chips is best effected by placing the pieces of cork on a sieve with close meshes and sprinkling it with thin liquid pitch. The sieve is shaken to remove the superfluous pitch and to prevent the pieces of cork from caking together. It has been found that in this way a very suitable heat-insulating and filtering material is obtained, the individual particles of which do not stick together.

For the filtering material somewhat finer cork chips are preferably selected, the individual fragments of which must however be more than 1½ to 2 millimetres in size. As heat-insulating material $t$, somewhat coarser cork chips may be selected, of about 5 millimetres in diameter.

By displacing the disc shaped perforated container $o$ in the box $i$ it is possible to alter the sizes of the spaces for the filtering material $u$ and for the heat-insulating material $t$.

The air in the ice safe is cooled by the ice, contracts and becomes heavier than the outer air. In consequence of the contraction a partial vacuum is created and the outer air flows through the upper filters $h$ into the ice safe. The heavy cold air falls down and flows through the filters of the bottom into the outer air. The air which enters through the metal tubes $i$ is precooled because the water of the melting ice which lies upon the cover flows down from said cover and cools that part of the metal tubes $k$ and $i$ which extends through the hollow space between the walls $b$ and $c$. By means of the filter the entering air is made dust-free and sterilized.

I claim:

1. In an air filter for refrigerating chambers, ice safes and the like, an open-ended tubular member adapted to be arranged transversely through the wall of the chamber, a disc shaped perforated container slidable in the open-ended tubular member and dividing the same into two compartments of relatively varying sizes, filtering material in one of the compartments, and heat insulating material in the other compartment, substantially as and for the purposes set forth.

2. In an air filter for refrigerating chambers, ice safes and the like, an open-ended tubular member adapted to be arranged transversely through the walls thereof, a reticulated disc shaped perforated container slidable in the open-ended tubular member and dividing the same into two compartments of relatively varying sizes depending on the position assumed by the disk shaped perforated container, air treating material carried by the reticulated disc shaped perforated container, filtering material arranged in one of the compartments of the open-ended tubular member, and heat-insulating material arranged in the other compartment.

3. In an air filter for refrigerating chambers, ice safes and the like, an open-ended tubular member adapted to be arranged transversely through the walls thereof, reticulated closures at the end of the tubular member, a disc shaped perforated container slidable adjustably in the tube and dividing the same into two compartments of relatively varying sizes depending on the position assumed by the disc shaped perforated container, said container having reticulated ends, an air treating material arranged between the reticulated ends of the disc shaped perforated container, filtering material arranged in one of the compartments of the tubular member, and heat insulating material arranged in the other compartment, substantially as and for the purposes set forth.

In testimony whereof I have signed my name to this specification.

ROBERT SPEIDEL.